US012650698B2

(12) United States Patent
Xu

(10) Patent No.: US 12,650,698 B2
(45) Date of Patent: Jun. 9, 2026

(54) AUTONOMOUS MOBILE DEVICE, OPERATING METHOD FOR AUTONOMOUS MOBILE DEVICE, SYSTEM AND STORAGE MEDIUM

(71) Applicant: Qfeeltech (Beijing) Co., Ltd., Beijing (CN)

(72) Inventor: Sichen Xu, Beijing (CN)

(73) Assignee: Qfeeltech (Beijing) Co., Ltd., Beijing (CN)

( * ) Notice: Subject to any disclaimer, the term of this patent is extended or adjusted under 35 U.S.C. 154(b) by 32 days.

(21) Appl. No.: 18/935,601

(22) Filed: Nov. 3, 2024

(65) Prior Publication Data

US 2025/0060759 A1     Feb. 20, 2025

Related U.S. Application Data

(63) Continuation of application No. PCT/CN2023/086771, filed on Apr. 7, 2023.

(30) Foreign Application Priority Data

Jun. 7, 2022     (CN) .......................... 202210637839.0

(51) Int. Cl.
   *G05D 1/622*     (2024.01)
   *G01S 17/42*     (2006.01)
   (Continued)

(52) U.S. Cl.
   CPC .............. G05D 1/637 (2024.01); G01S 17/42 (2013.01); G01S 17/89 (2013.01); G05D 1/2446 (2024.01);
   (Continued)

(58) Field of Classification Search
   CPC .......... A47L 11/02; G01S 17/42; G01S 17/89; G05D 1/2295; G05D 1/242; G05D 1/2446;
   (Continued)

(56) References Cited

U.S. PATENT DOCUMENTS 11,886,194 B1 *   1/2024   Ebrahimi Afrouzi .......................
                                                A47L 9/2857
2015/0032260 A1 *   1/2015   Yoon .................... G05D 1/6486
                                                700/257

(Continued)

FOREIGN PATENT DOCUMENTS

CN          105361817 A *   3/2016   ........... A47L 9/2884
CN          105990876 A     10/2016

(Continued)

OTHER PUBLICATIONS

International Search Report and Written Opinion dated Jun. 27, 2023, issued in PCT/CN2023/086771, filed on Apr. 7, 2023, and their English machine translations (15 pages).

*Primary Examiner* — Babar Sarwar
(74) *Attorney, Agent, or Firm* — Alleman Hall LLP

(57)                ABSTRACT

The present disclosure provides a method for operating an autonomous mobile device and a storage medium. The method includes: performing re-localization for the autonomous mobile device; detecting a first feature of an identifier; calculating a first relative location of an object having the identifier relative to the autonomous mobile device; calculating, based on the first relative location and a real time location of the autonomous mobile device, a current global location of the object; retrieving a prior global location of a charging station; comparing the current global location and the prior global location; when a difference between the current global location and the prior global location is greater than or equal to a predetermined difference thresh-
(Continued)

old: detecting a second feature of the object and determining whether the object is the charging station; when the object is the charging station, setting a temporary restricted zone.

17 Claims, 4 Drawing Sheets

(51) Int. Cl.

| | | |
|---|---|---|
| *G01S 17/89* | (2020.01) | |
| *G05D 1/244* | (2024.01) | |
| *G05D 1/246* | (2024.01) | |
| *G05D 105/10* | (2024.01) | |
| *G05D 111/10* | (2024.01) | |

(52) U.S. Cl.
CPC ......... *G05D 1/246* (2024.01); *G05D 2105/10* (2024.01); *G05D 2111/17* (2024.01)

(58) Field of Classification Search
CPC .... G05D 1/246; G05D 1/637; G05D 2105/10; G05D 2107/40; G05D 2109/10; G05D 2111/17
See application file for complete search history.

(56) References Cited

U.S. PATENT DOCUMENTS

| | | | | |
|---|---|---|---|---|
| 2017/0102709 | A1* | 4/2017 | Kwak | A47L 9/2805 |
| 2018/0246518 | A1* | 8/2018 | Vogel | B25J 9/0003 |
| 2019/0187717 | A1* | 6/2019 | He | A47L 11/40 |
| 2021/0370511 | A1* | 12/2021 | Hong | B25J 9/1666 |
| 2023/0371769 | A1* | 11/2023 | Kwak | B25J 9/16 |
| 2024/0061442 | A1* | 2/2024 | Lai | G05D 1/0272 |
| 2024/0184310 | A1* | 6/2024 | Zhu | B60L 53/35 |

FOREIGN PATENT DOCUMENTS

| | | | | | |
|---|---|---|---|---|---|
| CN | 106308685 | A | | 1/2017 | |
| CN | 108596084 | A | | 9/2018 | |
| CN | 109276190 | A | * | 1/2019 | ............. A47L 11/24 |
| CN | 109419460 | A | * | 3/2019 | ......... A47L 11/4011 |
| CN | 110221617 | A | | 9/2019 | |
| CN | 110597254 | A | | 12/2019 | |
| CN | 110597255 | A | * | 12/2019 | ............ G05D 1/247 |
| CN | 110609550 | A | * | 12/2019 | ............. B60L 53/67 |
| CN | 111000498 | A | | 4/2020 | |
| CN | 111930118 | A | | 11/2020 | |
| CN | 112890692 | A | | 6/2021 | |
| CN | 113440075 | A | * | 9/2021 | ......... A47L 11/4011 |
| CN | 216020830 | U | * | 3/2022 | |
| CN | 114287830 | A | | 4/2022 | |
| CN | 114428497 | A | | 5/2022 | |
| CN | 217118359 | U | * | 8/2022 | |
| CN | 217547929 | U | * | 10/2022 | |
| CN | 217696447 | U | * | 11/2022 | |
| CN | 219940501 | U | * | 11/2023 | |
| EP | 4206849 | A1 | * | 7/2023 | ............ G05D 1/661 |
| JP | 2011175393 | A | | 9/2011 | |
| JP | 2021140444 | A | | 9/2021 | |
| KR | 20220093178 | A | * | 7/2022 | ............ H02J 7/0013 |
| WO | 2019124343 | A1 | | 6/2019 | |
| WO | WO-2022062310 | A1 | * | 3/2022 | .......... G05D 1/2295 |
| WO | WO-2022234944 | A1 | * | 11/2022 | .......... B25J 11/0085 |

\* cited by examiner

Identifier 50

| Low Reflection Sub-Zone 502 | High Reflection Sub-Zone 501 | Low Reflection Sub-Zone 502 |
| --- | --- | --- |

FIG. 2

Environment

AUTONOMOUS MOBILE DEVICE, OPERATING METHOD FOR AUTONOMOUS MOBILE DEVICE, SYSTEM AND STORAGE MEDIUM

CROSS REFERENCE TO RELATED APPLICATIONS

This application is a continuation of International Application No. PCT/CN2023/086771, filed on Apr. 7, 2023, which claims priority to Chinese Patent Application No. 202210637839.0, filed on Jun. 7, 2022. The contents of the above-referenced applications are incorporated herein by reference in their entirety.

TECHNICAL FIELD

The present disclosure relates to an autonomous mobile device, an operating method for the autonomous mobile device, a system and a storage medium, and more specifically, to a system and a method for setting a location of a charging station as a temporary restricted zone in a map of an environment in which the autonomous mobile device operates.

BACKGROUND TECHNOLOGY

Autonomous mobile cleaning devices are commonly used autonomous mobile devices. Typically, an autonomous mobile cleaning device creates a map of an environment of a work zone in which the autonomous mobile device operates, and performs cleaning tasks for the work zone corresponding to the map along predetermined working routes. Obstacles usually exist in the environment, and an autonomous mobile cleaning device often collide with the obstacles during operations.

For the long term constant use of the autonomous mobile cleaning device, a battery is typically installed on the autonomous mobile cleaning device, in order to increase the operation mileage. In order to automatically charge the battery, a charging station is typically placed in the environment of the work zone, such that the autonomous mobile cleaning device can automatically return to the charging station to perform charging when the electric power of the battery of the autonomous mobile cleaning device is low. However, when the autonomous mobile cleaning device operates normally, on one hand, like other common obstacles, the charging station may block the normal operation of the autonomous mobile cleaning device, on the other hand, the collision between the autonomous mobile cleaning device and the charging station may cause the location of the charging station to shift, and the autonomous mobile cleaning device may move to a location or direction that is inconvenient for the autonomous mobile cleaning device to enter the charging station to perform charging, which may cause charging failure; the collision between the autonomous mobile cleaning device and the charging station may even damage the charging contact plate or other components of the charging station. Thus, during normal operations of the autonomous mobile cleaning device, it is desirable to avoid the collision between the autonomous mobile cleaning device and the charging station, and to keep a safe distance between the autonomous mobile cleaning device and the charging station; when the electric power of the autonomous mobile cleaning device is low, it may be needed for the autonomous mobile cleaning device to automatically return to the charging station to perform charging.

SUMMARY OF DISCLOSURE

An objective of the present disclosure is to address the above technical problems, and to provide a method for operating an autonomous mobile device, a system for operating an autonomous mobile device, an autonomous mobile device and a computer-readable storage medium.

According to a first aspect of the present disclosure, a method for operating an autonomous mobile device is provided, including: performing re-localization for the autonomous mobile device; after performing the re-localization for the autonomous mobile device, detecting a first feature of at least one first identifier in an environment in which the autonomous mobile device is located using at least one sensor on the autonomous mobile device; calculating, based on the detected first feature of the at least one first identifier, a first relative location of an object having the at least one first identifier relative to the autonomous mobile device; calculating, based on the first relative location and a real time location of the autonomous mobile device, a current global location of the object in a map coordinate system of a map corresponding to the environment; retrieving a prior global location of a charging station in the map coordinate system; comparing the current global location of the object with the prior global location of the charging station; in response to a difference between the current global location of the object and the prior global location of the charging station being greater than or equal to a predetermined difference threshold: detecting a second feature of the object; determining, based on the second feature, whether the object is a charging station; in response to determining that the object is the charging station, setting, based on the current global location, a temporary restricted zone in the map, such that the temporary restricted zone includes the current global location; during a time period in which the autonomous mobile device executes a work task, controlling the autonomous mobile device to avoid entering the temporary restricted zone; and when charging is needed for the autonomous mobile device (e.g., when the remaining electric power of the autonomous mobile device is smaller than a predetermined electric power threshold), controlling the autonomous mobile device to allow the autonomous mobile device to enter the temporary restricted zone.

In some embodiments, detecting the second feature of the object includes at least one of the following: detecting the second feature of the at least one first identifier of the object; or detecting the second feature of at least one second identifier of the object that is different from the at least one first identifier, In some embodiments, the method also includes: before performing the re-localization: detecting, using the at least one sensor, the first feature and the second feature of the object in the environment; identifying the charging station based on the detected first feature and the detected second feature; calculating a second relative location of the charging station relative to the autonomous mobile device; calculating, based on the real time location of the autonomous mobile device and the second relative location, the prior global location of the charging station in the map.

In some embodiments, before performing the re-localization, the method also includes: setting the temporary restricted zone in the map based on the prior global location, such that the temporary restricted zone includes the prior global location.

In some embodiments, the method also includes: in response to determining that the object is a charging station, setting the temporary restricted zone in the map, such that the temporary restricted zone does not include the prior global location.

In some embodiments, the at least one sensor includes a light detection and ranging device ("Lidar device"), the first feature includes a high reflection sub-zone of the at least one first identifier that is configured to reflect a laser, and the second feature includes at least one of the following: a spatial relationship between the high reflection sub-zone and a low reflection sub-zone of the at least one first identifier; or a ratio between an intensity of the laser reflected by the high reflection sub-zone of the at least one first identifier and an intensity of the laser reflected by the low reflection sub-zone of the at least one first identifier.

In some embodiments, the at least one sensor includes the Lidar device and an imaging sensor. The first feature includes a high reflection sub-zone of the at least one first identifier that is configured to reflect a laser, and the second feature includes at least one of a profile, a shape, or a pattern of the object.

According to a second aspect of the present disclosure, an operating method for an autonomous mobile device is provided. The operating method includes: identifying a charging station in an environment in which the autonomous mobile device operates; calculating a relative location of the charging station relative to the autonomous mobile device; calculating, based on the relative location and a real time location of the autonomous mobile device, a global location of the charging station in a map corresponding to the environment; setting a temporary restricted zone in the map, such that the temporary restricted zone includes the global location of the charging station; during a time period in which the autonomous mobile device executes a work task, controlling the autonomous mobile device to avoid entering the temporary restricted zone; and when charging is needed for the autonomous mobile device (e.g., when the remaining electric power of the autonomous mobile device is smaller than a predetermined electric power threshold), controlling the autonomous mobile device to allow the autonomous mobile device to enter the temporary restricted zone. Identifying the charging station includes: detecting at least one feature of the charging station in the environment using at least one sensor of the autonomous mobile device; and identifying the charging station based on the at least one feature.

In some embodiments, the at least one sensor includes a light detection and ranging device ("Lidar device"). The at least one feature includes a first feature and a second feature. The first feature includes a high reflection sub-zone of at least one identifier that is configured to reflect a laser, and the second feature includes at least one of the following: a spatial relationship between the high reflection sub-zone and a low reflection sub-zone of the at least one identifier; or a ratio between an intensity of the laser reflected by the high reflection sub-zone and an intensity of the laser reflected by the low reflection sub-zone.

In some embodiments, the at least one sensor includes a Lidar device and an imaging sensor. The at least one feature includes a first feature and a second feature. The first feature includes a high reflection sub-zone of at least one identifier that is configured to reflect the laser, and the second feature includes at least one of a profile, a shape, or a pattern of the charging station.

According to a third aspect of the present disclosure, a system for operating an autonomous mobile device is provided. The system includes: the autonomous mobile device; a charging station configured to charge the autonomous mobile device; one or more processors; and a storage device configured to store computer-executable instructions. When the instructions are executed by the one or more processors, the instructions cause the one or more processors to execute the method according to the first aspect or the second aspect.

According to a fourth aspect of the present disclosure, an autonomous mobile device is provided, including: one or more processors; and a storage device configured to store computer-executable instructions. When the instructions are executed by the one or more processors, the instructions cause the one or more processors to execute the method according to the first aspect or the second aspect.

According to a fifth aspect of the present disclosure, a non-transitory computer-readable storage medium is provided. The non-transitory computer-readable storage medium is configured to store instructions. When the instructions are executed by one or more processors, the instructions cause the one or more processors to execute the method according to the first aspect or the second aspect.

According to a sixth aspect of the present disclosure, a computer program product is provided. The computer program product includes computer-executable instructions. When the instructions are executed by a computer, the instructions cause the computer to execute the method according to the first aspect or the second aspect.

According to the technical solution of the present disclosure, the autonomous mobile cleaning device can avoid collision with the charging station while performing a cleaning task. In the meantime, power consumption and computation load are also reduced, thereby increasing the accuracy of identifying the charging station.

Based on the following detailed descriptions of the illustrative embodiments described with reference to the drawings, other aspects of the present disclosure will become clearer.

BRIEF DESCRIPTIONS OF DRAWINGS

FIG. 2 is a schematic illustration of at least one identifier of a charging station according to an illustrative embodiment of the present disclosure.

DETAILED DESCRIPTIONS

Figure 1:
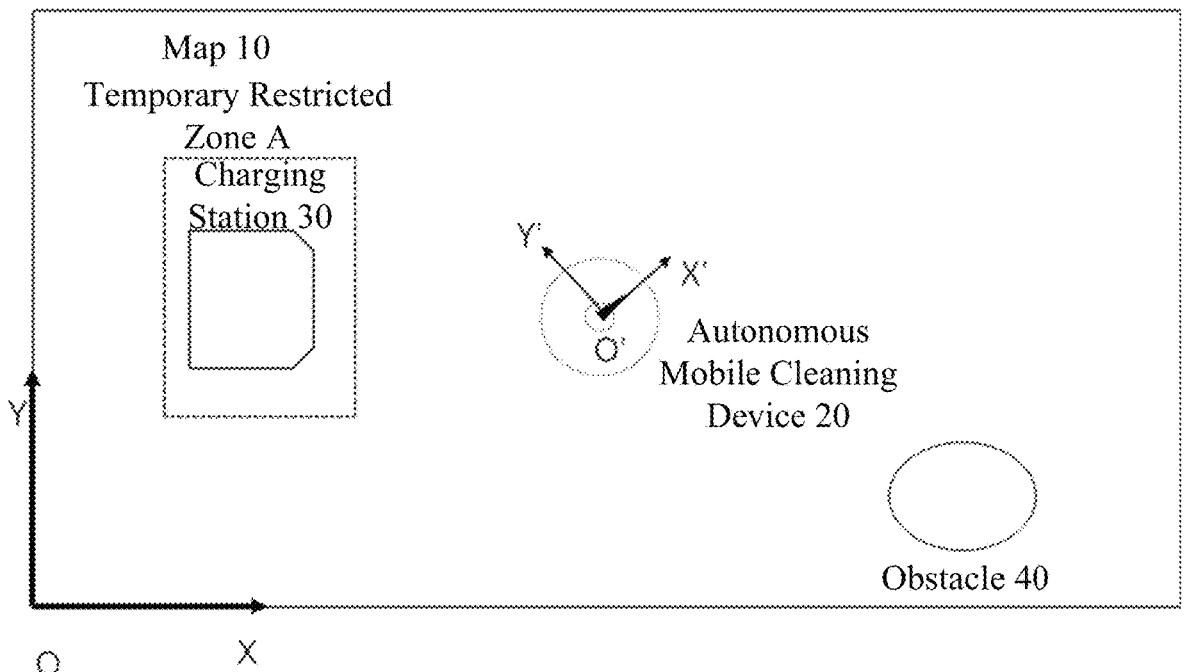
FIG. 1 is a schematic illustration of an environment in which an autonomous mobile cleaning device operates according to an illustrative embodiment of the present disclosure.

Next, with reference to the drawings, various illustrative embodiments, features, and aspects of the present disclosure will be described in detail. The same labels in the drawings represent components having the same or similar functions. Although various aspects of the embodiments are shown in the drawings, unless otherwise noted, the drawings are not necessarily to scale.

The specific term "illustrative" used herein means "as an example, an embodiment, or an illustration." Any embodiment described as "illustrative" herein should not be interpreted as being advantageous or better than other embodiments.

In addition, to better describe the present disclosure, various specific details are provided in the detailed implementations described below. A person having ordinary skills in the art can appreciate that, without certain specific details, the present disclosure can still be implemented. In some embodiments, methods, means, elements and electric circuits that are well-known to a person having ordinary skills in the art are not described in detail, such that the main principle of the present disclosure can be more conveniently explained.

For example, in the following illustrative embodiments, an autonomous mobile cleaning device and a charging station are used as examples to describe the principle of the present disclosure. A person having ordinary skills in the art can appreciate that the technical solutions of the present disclosure can also be implemented in other autonomous mobile devices and other corresponding devices with which the autonomous mobile devices need to avoid collision.

FIG. 1 illustrates an environment in which an autonomous mobile cleaning device operates according to an illustrative embodiment of the present disclosure. The environment may include an autonomous mobile cleaning device 20, a charging station 30, and an ordinary obstacle 40 (also referred to as obstacle in the present disclosure). The autonomous mobile cleaning device 20 may create an environmental map 10 of a work zone based on sensor signals (e.g., signals from environmental sensors such as an ultrasound distance measuring sensor, a Lidar device and/or an imaging sensor, and dead reckoning sensors such as an inertial measurement unit ("IMU"), an odometer, etc.) and based on corresponding algorithms (such as Simultaneous Localization and Mapping ("SLAM")), and may cover one or more zones in the map according to a predetermined work route when executing cleaning tasks, in order to finish the cleaning work tasks. During a process of the autonomous mobile cleaning device performing a cleaning task, when a recharging condition is not satisfied, the autonomous mobile cleaning device 20 may need to be controlled to move while maintaining a predetermined distance from the charging station, in order to avoid collision with the charging station during a normal operation. When the recharging condition is satisfied, for example, when an electric power of the autonomous mobile cleaning device 20 is lower than a predetermined electric power threshold, the autonomous mobile cleaning device 20 may be controlled to return to the charging station 30 to perform charging.

The map 10 has a map coordinate system, such as a Cartesian coordinate system XOY. In the embodiment shown in FIG. 1, the map coordinate system uses the left lower corner of the map 10 as an origin O, the X axis is defined as the left-to-right horizontal direction, the Y axis is defined as the bottom-to-top vertical direction. As such, the coordinate locations, i.e., the global locations, of the autonomous mobile cleaning device 20, the charging station 30, and the obstacle 40, can be represented in the map coordinate system, i.e., the Cartesian coordinate system of the present embodiment. A person having ordinary skills in the art can appreciate that the map coordinate system may also adopt other coordinate systems, such as the polar coordinate system, etc. The present disclosure does not limit the specific form of the coordinate system.

In actual implementations, the autonomous mobile cleaning device 20 may detect an object, such as the charging station 30 and the obstacle 40, in the environment using an environmental sensor mounted on the autonomous mobile cleaning device 20 (e.g., a Lidar device or an imaging sensor, etc.).

Figure 2:
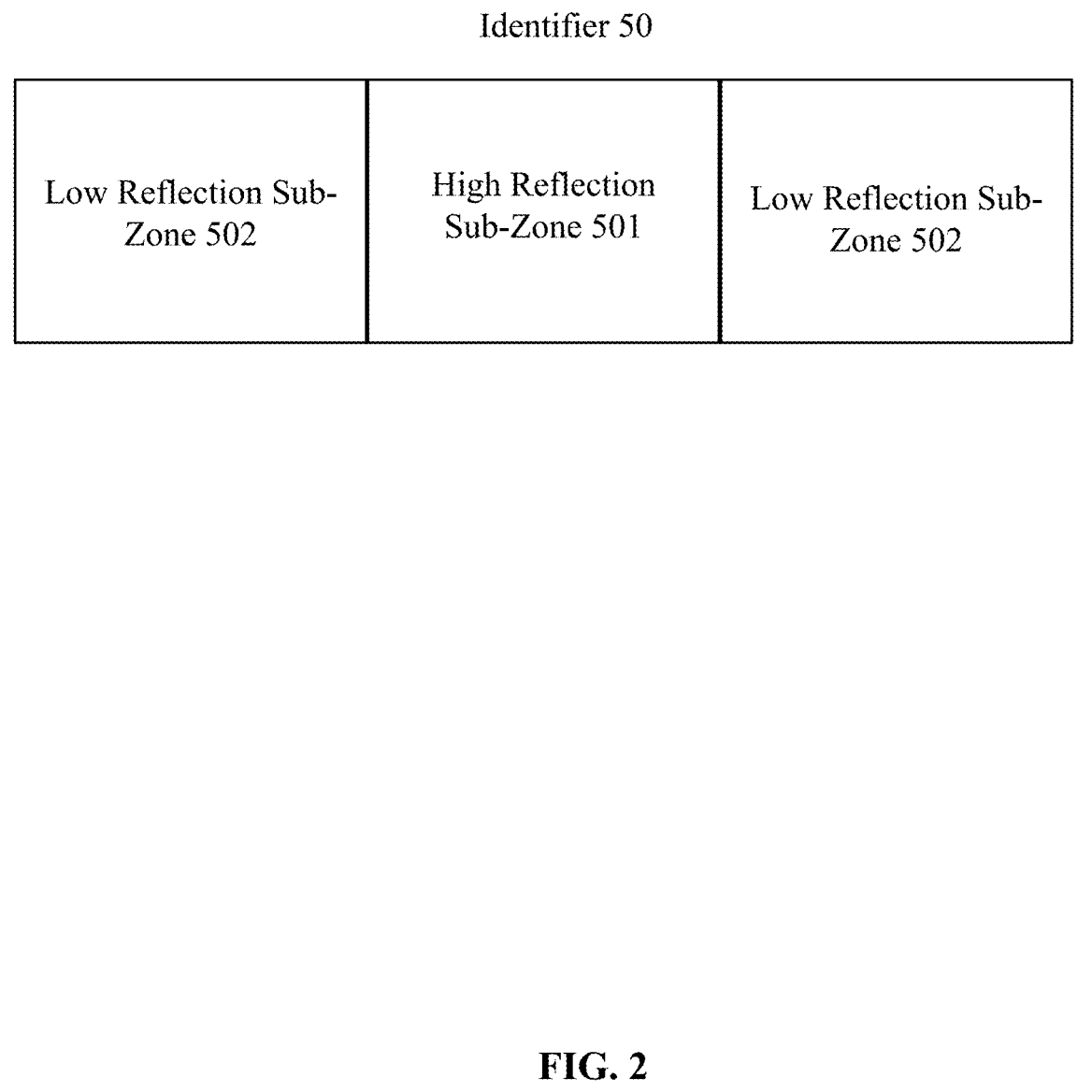

In a first embodiment, the autonomous mobile cleaning device 20 may include a Lidar device. As shown in FIG. 2, the charging station 30 may have an identifier 50 formed by one or more high reflection sub-zones 501 and one or more low reflection sub-zones 502 arranged in a predetermined pattern. Although one high reflection sub-zone 501 is shown for illustrative purposes, it is understood that any suitable number of high reflection sub-zones 501 may be included. Likewise, although two low reflection sub-zones 502 are shown for illustrative purposes, any suitable number of low reflection sub-zones 502 may be included. The Lidar device may measure a distance from the autonomous mobile cleaning device 20 to an object in the environment through emitting a laser and receiving a reflected laser that is reflected by the object in the environment. In the meantime, if the laser emitted from the Lidar device reaches the identifier 50 having a high reflection material, the Lidar device may detect the identifier 50 having the high reflection material through receiving the reflected light from the identifier 50. Therefore, based on the received reflected light, the autonomous mobile cleaning device 20 may identify the identifier 50, and further identify the charging station 30 based on the identification of the identifier 50, thereby further calculating the relative location of the charging station 30 relative to the Lidar device. In this embodiment, for example, the Lidar device may detect the reflected light from the high reflection sub-zone 501 (i.e., the first feature). Further, a spatial arrangement relationship (or referred to as a spatial relationship) between the high reflection sub-zone 501 and the low reflection sub-zone 502 (i.e., the second feature) may be derived based on the corresponding different locations of the reflected lights having different intensities that are received from the high reflection sub-zone 501 and the low reflection sub-zone 502, and the identifier 50 may be identified based on the spatial arrangement relationship. If the Lidar device receives weak-strong-weak reflected lights sequentially, then it may be derived that the sub-zone arrangement is low reflection sub-zone-high reflection sub-zone-low reflection sub-zone, thereby detecting the identifier 50, and further determining that the charging station 30 is detected. As a supplement to or an alternative of the above illustration, the identifier 50 may be identified based on the ratio between the intensities of the received reflected lights of different intensities (i.e., the second feature). If the reflected light received by the Lidar device from the high reflection sub-zone 501 has an intensity A, the reflected light received from the low reflection sub-zone 502 has an intensity B, and the ratio A/B between the intensity A and the intensity B satisfies a predetermined value, it may be determined that the identifier 50 is detected and it may be further determined that the charging station 30 is detected.

In another embodiment based on the first embodiment, the autonomous mobile cleaning device 20 includes an imaging sensor such as a camera. The charging station 30 may include a triangular pattern as the identifier. The autonomous mobile cleaning device 20 may detect the triangular pattern (i.e., the first feature) in the images obtained by the imaging sensor. Further, if the detected triangular pattern has certain characteristics, for example, being an isosceles right triangle (i.e., the second feature), then it may be determined that the identifier has been detected, and it may further be determined that the charging station 30 is detected.

In another embodiment based on the first embodiment, the autonomous mobile cleaning device 20 includes an imaging sensor such as a camera. The shape of the charging station 30 may be used as the identifier. The autonomous mobile cleaning device 20 may detect a rectangular profile (i.e., the first feature) from the images obtained by the imaging sensor. Further, if a ratio between a height and a width of the detected profile matches a ratio between a height and a width of the charging station 30 (i.e., the second feature), it may be determined that the identifier is detected, and it may be further determined that the charging station 30 is detected. A person having ordinary skills in the art can adopt other forms of identifier and corresponding sensors to accomplish identification of the identifier, thereby realizing the identification of the charging station 30, which is not limited by the present disclosure.

In another embodiment based on the first embodiment, the charging station 30 may be identified based on a combination of multiple identifications of multiple identifiers. For example, the charging station 30 may be identified based on identification of a spatial arrangement relationship between the high reflection sub-zone 501 and the low reflection sub-zone 502 through a Lidar device, and based on identification of a ratio between a height and a width of a profile in images obtained by an imaging sensor, and based on a condition that both identifications satisfy predetermined conditions. Alternatively or additionally, the charging station 30 may be identified based on a partial combination of multiple identifications of multiple identifiers. For example, the Lidar device may only identify that the high reflection sub-zone 501 exists, and in the meantime, the imaging sensor may only identify that the rectangular profile exists in the images, and the charging station 30 is identified when the existence of both is identified. The present disclosure does not limit the specific quantity and form of the combination.

The autonomous mobile cleaning device 20 has its own mobile coordinate system X'O'Y'. Through existing localization technology and coordinate transformation algorithm, a relative location of the identified object in the mobile coordinate system of the autonomous mobile cleaning device 20 may be calculated, which is also the relative location of the object relative to the autonomous mobile cleaning device 20. After detecting the charging station 30, a relative location (X'1, Y'1) of the charging station 30 relative to the autonomous mobile cleaning device 20 in the mobile coordinate system (i.e., a second relative location) may be calculated.

In the meantime, the autonomous mobile cleaning device 20 may use a dead reckoning sensor (e.g., the IMU and the odometer, etc.) on the autonomous mobile cleaning device 20 to realize the localization in the map, i.e., to determine the global location of the autonomous mobile cleaning device 20 in the map coordinate system. A person having ordinary skills in the art can appreciate that, when the relative location of the object relative to the mobile coordinate system and the global location of the autonomous mobile cleaning device 20 in the map coordinate system are obtained, the coordinate location of the object in the map (i.e., the global location in the map coordinate system) may be calculated through regular coordinate transformation. As such, the global location (X1, Y1) of the charging station 30 in the map coordinate system of the map 10 may be obtained.

In order to better avoid collision with the charging station during the cleaning task operations, a temporary restricted zone A may be set in the map based on the global location (X1, Y1) of the charging station (i.e., the prior global location), and the temporary restricted zone A includes the charging station 30. During the cleaning task operations, the autonomous mobile cleaning device 20 may be controlled to not enter the temporary restricted zone to avoid collision with the charging station 30. When the autonomous mobile cleaning device 20 satisfies a predetermined charging condition, for example, when the remaining electric power of the autonomous mobile cleaning device 20 is smaller than a predetermined electric power threshold, or when the moving time period has reached a predetermined time period, or when the moving distance and/or area have reached predetermined thresholds, the autonomous mobile cleaning device 20 may be allowed and guided to enter the temporary restricted zone A, thereby enabling the autonomous mobile cleaning device 20 to return to the charging station 30 to perform charging.

In the above embodiment, after the temporary restricted zone A is set in the map 10, during the subsequent cleaning task operations, the global location of the temporary restricted zone A may be retrieved and the autonomous mobile cleaning device 20 may be controlled based on the global location to maintain a predetermined distance from the charging station 30. Thus, the charging station 30 does not need to constantly emit a collision avoidance signal to block the autonomous mobile cleaning device 20 from approaching the charging station 30. As a result, the number of components can be saved, power consumption can be reduced, and computation load can be decreased.

The autonomous mobile cleaning device 20 may perform a re-localization at the start of each work task and under other conditions (e.g., when restoring from a work interruption, or when responding to a user instruction), in order to determine a real time global location of the autonomous mobile cleaning device 20 in the map, i.e., the real time coordinate location in the map. In the second embodiment, after the autonomous mobile cleaning device 20 performs re-localization, the location of the charging station 30 may be updated, and a temporary restricted zone may be set correspondingly. The term "re-localization" as used herein can be interpreted the same as "localization," that is, determination of a current location of the autonomous mobile device (e.g., the autonomous mobile cleaning device 20).

For example, after performing the re-localization, the autonomous mobile cleaning device 20 may detect, using a Lidar device, the high reflection sub-zone 501 of the identifier 50 in the environment (i.e., the first feature). When the high reflection sub-zone 501 is detected, it may indicate that a corresponding object exists in the environment, and this object may or may not be the charging station 30.

Different from the first embodiment, in the present embodiment, after the high reflection sub-zone 501 is detected, the spatial relationship between the high reflection sub-zone 501 and the low reflection sub-zone 502 and the ratio between intensities of lights reflected from the high reflection sub-zone 501 and the low reflection sub-zone 502 may not need to be calculated. Instead, to reduce the computation load, and to shorten the data feedback time, in this embodiment, first, a relative location (i.e., a first relative location) between the high reflection sub-zone 501 and the autonomous mobile cleaning device 20 may be determined, and the current global location of the high reflection sub-zone 501 in the map 10 may be calculated based on the relative location and the current global location of the autonomous mobile cleaning device 20, i.e., the current global location of the object may be obtained. Then, the prior global location of the previously identified charging station 30 may be retrieved from the map 10, and the current global location of the object and the prior global location of the charging station 30 recorded in the map may be compared. When the difference between the current global location of the object and the prior global location of the charging station 30 recorded in the map is smaller than a predetermined difference threshold, for example, when the difference between the two in the X axis direction is $\Delta x < 0.5$ m, and/or when the difference between the two in the Y axis direction is $\Delta y < 0.5$ m, then it may be determined that the object detected after the re-localization is the charging station 30. Under this condition, the setting of the temporary restricted zone A need not be adjusted, and in subsequent normal task operations, the collision with the charging station 30 may be avoided based on the temporary restricted zone A. A person having ordinary skills in the art can set the above predetermined difference threshold based on actual need, which is not specifically limited by the present disclosure.

When the difference between the current global location of the object and the prior global location of the charging station 30 recorded in the map is greater than or equal to a predetermined difference threshold, then it is possible that the object is not the charging station 30, or it is possible that the charging station 30 has moved in the environment. Therefore, when the difference between the current global location of the object and the prior global location of the charging station recorded in the map is greater than or equal to the predetermined difference threshold, an additional feature may be needed to identify whether the object is or is not the charging station 30.

In another embodiment based on the second embodiment, the additional feature (i.e., the second feature) may be extracted from the identifier 50 to perform a definitive determination. For example, after the existence of the high reflection sub-zone 501 is detected, the spatial arrangement relationship between the high reflection sub-zone 501 and the low reflection sub-zone 502 may be obtained, and the identifier 50 may be identified based on the spatial arrangement relationship. As such, a definitive determination may be made that the identified object is the charging station 30. Alternatively, after the existence of the high reflection sub-zone 501 is detected, a ratio between the intensities of the reflected lights from the high reflection sub-zone 501 and the low reflection sub-zone 502 may be further obtained, to identify the identifier 50, thereby definitively identifying that the object is the charging station 30.

In another embodiment based on the second embodiment, the second feature may be extracted from another additional identifier (e.g., a second identifier) that is different from the identifier 50 (which may be referred to as a first identifier for the convenience of description), to perform the definitive determination. For example, after the existence of the high reflection sub-zone 501 is detected, an image of the object may be further obtained using an imaging sensor. When a triangular pattern in another additional identifier (e.g., the second identifier) of the object is detected from the image, or when it is detected from the image that the object has a rectangular profile, then it may be definitively identified that the object is the charging station 30. In some embodiments, the second feature may be other types of features.

The first feature and the second feature in the second embodiment and related embodiments may be other types of features. Specific types and specific detecting methods may refer to the above descriptions of the first embodiment, which are not repeated.

When the difference between the current global location of the object and the prior global location of the charging station 30 recorded in the map is greater than or equal to the predetermined difference threshold, but the object that is located at the current global location is identified as an object different from the charging station 30, it indicates that the object is only another object having the first feature.

Figure 3:
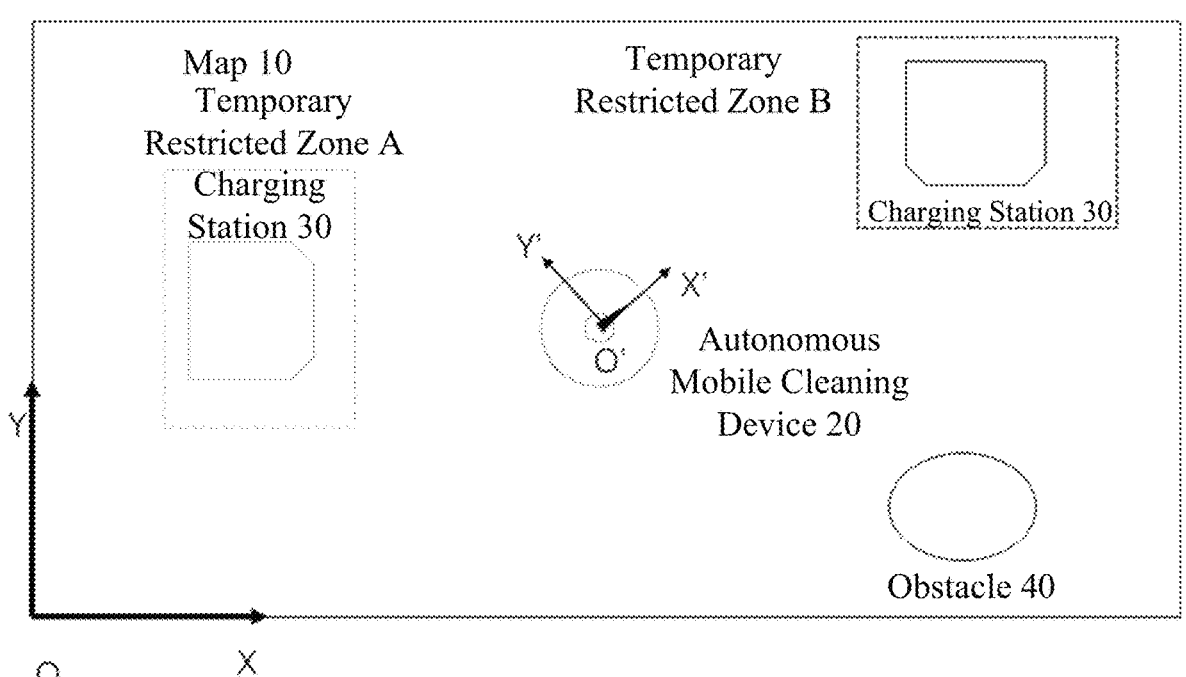
FIG. 3 is a schematic illustration of updating a temporary restricted zone according to an illustrative embodiment of the present disclosure.

When the difference between the current global location of the object and the prior global location of the charging station 30 recorded in the map is greater than or equal to the predetermined difference threshold, and the object at the current global location is determined as the charging station 30, then it indicates that the location of the charging station 30 in the map has changed. As shown in FIG. 3, the location of the charging station 30 in the map has been updated to a new location (i.e., the current global location). Correspondingly, the temporary restricted zone may be set based on the current global location, in order to obtain a temporary restricted zone B that includes the new location of the charging station 30.

In the second embodiment, the autonomous mobile cleaning device 20 may first detect the first feature. For example, when the autonomous mobile cleaning device 20 performs a cleaning task, the Lidar device may continuously operate to sense the surrounding environment. Under such circumstances, also using the Lidar device to detect the existence of the high reflection sub-zone 501 does not excessively cause an increase in the power consumption and computation loads, and the detection results can be obtained quickly. When it is determined based on the detection of the first feature that the location of the charging station 30 in the map 10 does not change, then the detection of the second feature may not be started, thereby saving the electric power and computation power, and reducing the detection time. When it is preliminarily determined based on the detection of the first feature that the charging station 30 may appear at a new location, detection of the second feature may be started to more accurately confirm whether the location of the charging station 30 in the map 10 indeed has changed, such that the location of the charging station 30 may be updated and the temporary restricted zone may be correspondingly set when the location of the charging station 30 indeed has changed. The autonomous mobile cleaning device 20 may realize avoidance of collision with the charging station 30 based on the temporary restricted zone B during subsequent cleaning tasks.

Figure 4:
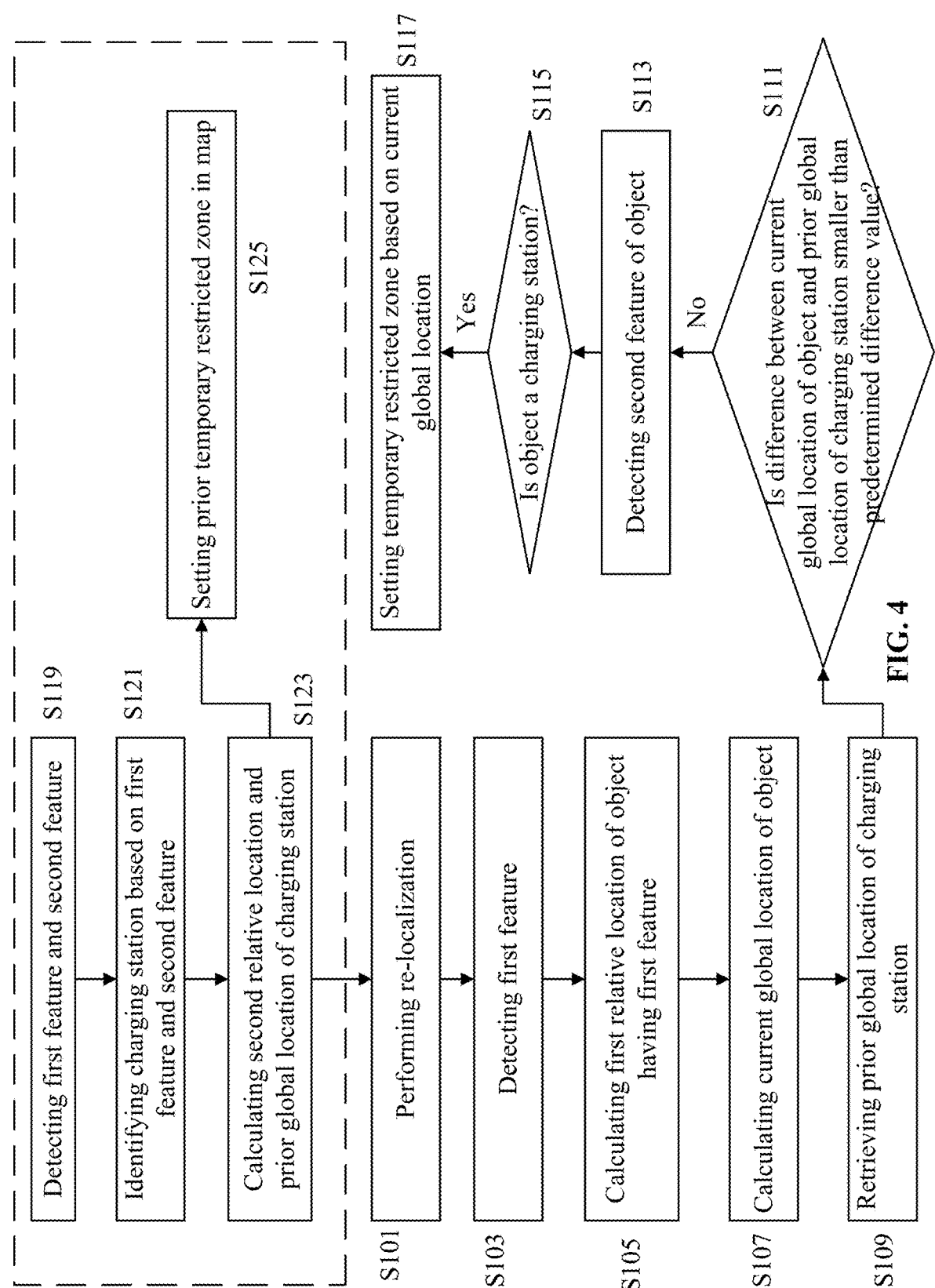
FIG. 4 is a flowchart illustrating a method according to an illustrative embodiment of the present disclosure.

FIG. 4 is a flowchart illustrating a method 100 according to an illustrative embodiment of the present disclosure. In step S101, the autonomous mobile cleaning device 20 may perform re-localization. In step S103, a sensor on the autonomous mobile cleaning device 20 may detect in the environment a first feature of the first identifier 50. The specific type of the first feature and the specific detection method have been described in the above embodiments, which are not repeated.

After the first feature is detected, in step S105, the first relative location of the object having the first feature in the mobile coordinate system of the autonomous mobile cleaning device may be calculated. Then in step S107, the current global location of the object in the map under the map coordinate system may be calculated based on the first relative location and the real time global location of the autonomous mobile cleaning device. Next, in step S109, the prior global location of the charging station 30 labeled in the map 10 may be retrieved, and in step S111, the current global location of the object and the prior global location of the charging station 30 recorded in the map may be compared.

In step S111, when the difference between the current global location of the object and the prior global location of the charging station 30 recorded in the map is smaller than the predetermined difference threshold, it may be determined that the object at the similar location is the charging station 30, and the setting of the temporary restricted zone in the map may not need to be changed.

In step S111, when the difference between the current global location of the object and the prior global location of the charging station 30 recorded in the map is greater than or equal to the predetermined difference threshold, then it is possible that the object is an object different from the charging station 30, or it is possible that the charging station 30 has moved in the environment, and is no longer at the prior global location recorded in the map. Next, in step S113, the second feature of the object may be detected. The specific type and specific detection method of the second feature have been described in the above embodiment, which are not repeated.

In step S115, a further determination may be made based on the second feature to determine whether the object is the charging station 30. When the object is only an object having the first feature, then it may not need to change the location of the charging station 30 in the map and the setting of the temporary restricted zone. When it is determined that the object is indeed the charging station 30, then it indicates that the charging station 30 is at a new location, i.e., the current global location. Under this circumstance, in step S117, a temporary restricted zone may be set based on the current global location in the map 10, such that the temporary restricted zone includes the current global location (i.e., the new location of the charging station 30).

Through steps S101-S105, after the re-localization of the autonomous mobile cleaning device 20 is performed, the identification of the charging station 30 is realized. The global location of the autonomous mobile cleaning device 20 may be determined and a new temporary restricted zone may be established when the global location is updated. The autonomous mobile cleaning device 20 may realize avoidance of collision with the charging station 30 based on the temporary restricted zone during subsequent cleaning tasks.

In the above method, the "prior global location" of the charging station 30 in the map 10 may be obtained before step S101 through the following method. In step S119, a sensor on the autonomous mobile cleaning device 20 may detect the first feature and the second feature in the environment. The specific types of the first feature and the second feature and the specific detection methods have been described in the above embodiments, which are not repeated. Next, in step S121, the charging station 30 may be identified based on the detected first feature and second feature. In step S123, a second relative location of the charging station 30 in the mobile coordinate system of the autonomous mobile cleaning device 20 may be calculated, and the global location of the charging station 30 in the map coordinate system may be calculated based on the second relative location and the real time location of the autonomous mobile cleaning device 20, which may be used as the "prior global location" used in steps S101-S117 (i.e., the temporally subsequent steps). In some embodiments, in step S125, a prior temporary restricted zone may be set in the map 10 based on the prior global location; then in step S117, setting the temporary restricted zone based on the current global location may include updating the prior temporary restricted zone, such that the updated temporary restricted zone includes the current global location.

In some embodiments, the methods described in the above embodiments of the present disclosure may be implemented in a system configured to operate the autonomous mobile device. The system may include the autonomous mobile device, a charging station configured to charge the autonomous mobile device, one or more processors, and a storage device configured to store computer-executable instructions. When the instructions are executed by the one or more processors, the instructions cause the one or more processors to execute the methods described in the above embodiments.

In some embodiments, the autonomous mobile device may include one or more processors, and a storage device configured to store instructions. The processor may include, but not be limited to, an application specific integrated circuit (ASIC), a digital signal processor (DSP), a digital signal processing device (DSPD), a programmable logic device (PLD), a field programmable gate array (FPGA), a controller, a microcontroller, a microprocessor, or any other suitable electronic device. When the instructions are executed by the one or more processors, the instructions cause the one or more processors to execute the methods described in the above embodiments.

In some embodiments, a non-transitory computer-readable storage medium or program product is provided. Instructions stored in the computer-readable storage medium or program product may be executed by a processor to accomplish the above-described methods for operating the autonomous mobile device. The processor includes, but is not limited to, an application specific integrated circuit (ASIC), a digital signal processor (DSP), a digital signal processing device (DSPD), a programmable logic device (PLD), a field programmable gate array (FPGA), a controller, a microcontroller, a microprocessor, or any other suitable electronic device.

In the device of the above embodiments, specific methods for operating each module or unit included therein have been described in detail in the embodiments of the related methods, which are not repeated in detail.

Various embodiments of the present disclosure have been described above. The above descriptions are illustrative, and are not exhaustive, and are not limited to the disclosed various embodiments. Without deviating from the scope and spirit of various described embodiments, many modifications and changes are obvious to a person having ordinary skills in the art. The terms selected in the present disclosure are based on the purpose of best explaining the principles of various embodiments, the actual applications, or the improvements to the technologies in the market, or to enable other persons having ordinary skills in the art to understand various embodiments disclosed in the present disclosure.

What is claimed is:

1. A method for operating an autonomous mobile device, comprising:

performing a re-localization for the autonomous mobile device;

after the re-localization, detecting, by at least one sensor on the autonomous mobile device, a first feature of at least one first identifier in an environment in which the autonomous mobile device operates;

calculating, based on the detected first feature of the at least one first identifier, a first relative location of an object having the at least one first identifier relative to the autonomous mobile device;

calculating, based on the first relative location and a real time location of the autonomous mobile device, a current global location of the object in a map in a coordinate system of the map corresponding to the environment;

retrieving a prior global location of a charging station in the coordinate system of the map;

comparing the current global location of the object with the prior global location of the charging station;

in response to a difference between the current global location of the object and the prior global location of the charging station being greater than or equal to a predetermined difference threshold:

detecting a second feature of the object;

determining, based on the second feature, whether the object is the charging station; and in response to a determination that the object is the charging station, setting, based on the current global location, a temporary restricted zone in the map, wherein the temporary restricted zone includes the current global location;

during a time period in which the autonomous mobile device executes a work task, controlling the autonomous mobile device to avoid entering the temporary restricted zone; and when charging is needed for the autonomous mobile device, controlling the autonomous mobile device to allow the autonomous mobile device to enter the temporary restricted zone.

2. The method of claim 1, wherein detecting the second feature of the object includes at least one of the following:

detecting the second feature of the at least one first identifier of the object; or detecting the second feature of at least one second identifier of the object that is different from the at least one first identifier.

3. The method of claim 1, further comprising:

before performing the re-localization:

detecting, by the at least one sensor, the first feature and the second feature in the environment;

identifying the charging station based on the detected first feature and the detected second feature;

calculating a second relative location of the charging station relative to the autonomous mobile device; and calculating, based on the real time location of the autonomous mobile device and the second relative location, the prior global location of the charging station in the map.

4. The method of claim 3, further comprising:

before performing the re-localization, setting, based on the prior global location, the temporary restricted zone in the map, wherein the temporary restricted zone includes the prior global location.

5. The method of claim 4, further comprising:

in response to determining that the object is the charging station, setting the temporary restricted zone in the map, wherein the temporary restricted zone does not include the prior global location.

6. The method of claim 1, wherein the at least one sensor includes a light detection and ranging device, the first feature includes a high reflection sub-zone of the at least one first identifier, wherein the high reflection sub-zone is configured to reflect a laser, and wherein the second feature includes at least one of the following:

a spatial relationship between the high reflection sub-zone of the at least one first identifier and a low reflection sub-zone of the at least one first identifier; or a ratio between an intensity of the laser reflected by the high reflection sub-zone of the at least one first identifier and an intensity of the laser reflected by the low reflection sub-zone of the at least one first identifier.

7. The method of claim 1, wherein the at least one sensor includes a light detection and ranging device and an imaging sensor, wherein the first feature includes a high reflection sub-zone of the at least one first identifier, wherein the high reflection sub-zone is configured to reflect a laser, and the second feature includes at least one of a profile, shape, or pattern of the object.

8. An autonomous mobile device, comprising:

one or more processors;

a storage device configured to store computer-executable instructions, which, when executed by the one or more processors, cause the one or more processors to perform a method comprising:

performing a re-localization for the autonomous mobile device;

after the re-localization, detecting, by at least one sensor on the autonomous mobile device, a first feature of at least one first identifier in an environment in which the autonomous mobile device operates;

calculating, based on the detected first feature of the at least one first identifier, a first relative location of an object having the at least one first identifier relative to the autonomous mobile device;

calculating, based on the first relative location and a real time location of the autonomous mobile device, a current global location of the object in a map in a coordinate system of the map corresponding to the environment;

retrieving a prior global location of a charging station in the coordinate system of the map;

comparing the current global location of the object with the prior global location of the charging station;

in response to a difference between the current global location of the object and the prior global location of the charging station being greater than or equal to a predetermined difference threshold:

detecting a second feature of the object;

determining, based on the second feature, whether the object is the charging station; and in response to a determination that the object is the charging station, setting, based on the current global location, a temporary restricted zone in the map, wherein the temporary restricted zone includes the current global location;

during a time period in which the autonomous mobile device executes a work task, controlling the autonomous mobile device to avoid entering the temporary restricted zone; and when charging is needed for the autonomous mobile device, controlling the autonomous mobile device to allow and guide the autonomous mobile device to enter the temporary restricted zone.

9. The autonomous mobile device of claim 8, wherein the at least one sensor includes a light detection and ranging device, the first feature includes a high reflection sub-zone of the at least one first identifier, the high reflection sub-zone is configured to reflect a laser, and the second feature includes at least one of the following:

a spatial relationship between the high reflection sub-zone of the at least one first identifier and a low reflection sub-zone of the at least one first identifier; or a ratio between an intensity of the laser reflected by the high reflection sub-zone and an intensity of the laser reflected by the low reflection sub-zone.

10. The autonomous mobile device of claim 8, wherein the at least one sensor includes a light detection and ranging device and an imaging sensor, the first feature includes a high reflection sub-zone of the at least one first identifier, the high reflection sub-zone is configured to reflect a laser, and the second feature includes at least one of a profile, a shape, or a pattern of the charging station.

11. A non-transitory computer-readable storage medium storing instructions, wherein when the instructions are executed by one or more processors, the instructions cause the one or more processors to execute a method for operating an autonomous mobile device, the method comprising:
  performing a re-localization for the autonomous mobile device;
after the re-localization, detecting, by at least one sensor on the autonomous mobile device, a first feature of at least one first identifier in an environment in which the autonomous mobile device operates;
  calculating, based on the detected first feature of the at least one first identifier, a first relative location of an object having the at least one first identifier relative to the autonomous mobile device;
  calculating, based on the first relative location and a real time location of the autonomous mobile device, a current global location of the object in a map in a coordinate system of the map corresponding to the environment;
  retrieving a prior global location of a charging station in the coordinate system of the map;
  comparing the current global location of the object with the prior global location of the charging station;
  in response to a difference between the current global location of the object and the prior global location of the charging station being greater than or equal to a predetermined difference threshold:
    detecting a second feature of the object;
    determining, based on the second feature, whether the object is the charging station; and
    in response to a determination that the object is the charging station, setting, based on the current global location, a temporary restricted zone in the map, wherein the temporary restricted zone includes the current global location;
  during a time period in which the autonomous mobile device executes a work task, controlling the autonomous mobile device to avoid entering the temporary restricted zone; and
  when charging is needed for the autonomous mobile device, controlling the autonomous mobile device to allow the autonomous mobile device to enter the temporary restricted zone.
12. The non-transitory computer-readable storage medium of claim 11, wherein detecting the second feature of the object includes at least one of the following:
  detecting the second feature of the at least one first identifier of the object; or
  detecting the second feature of at least one second identifier of the object that is different from the at least one first identifier.

13. The non-transitory computer-readable storage medium of claim 11, wherein the method further comprises:
  before performing the re-localization:
    detecting, by the at least one sensor, the first feature and the second feature in the environment;
    identifying the charging station based on the detected first feature and the detected second feature;
    calculating a second relative location of the charging station relative to the autonomous mobile device; and
    calculating, based on the real time location of the autonomous mobile device and the second relative location, the prior global location of the charging station in the map.
14. The non-transitory computer-readable storage medium of claim 13, wherein the method further comprises:
  before performing the re-localization, setting, based on the prior global location, the temporary restricted zone in the map, wherein the temporary restricted zone includes the prior global location.
15. The non-transitory computer-readable storage medium of claim 14, wherein the method further comprises:
  in response to determining that the object is the charging station, setting the temporary restricted zone in the map, wherein the temporary restricted zone does not include the prior global location.
16. The non-transitory computer-readable storage medium of claim 11, wherein
  the at least one sensor includes a light detection and ranging device, the first feature includes a high reflection sub-zone of the at least one first identifier, wherein the high reflection sub-zone is configured to reflect a laser, and wherein the second feature includes at least one of the following:
  a spatial relationship between the high reflection sub-zone of the at least one first identifier and a low reflection sub-zone of the at least one first identifier; or
  a ratio between an intensity of the laser reflected by the high reflection sub-zone of the at least one first identifier and an intensity of the laser reflected by the low reflection sub-zone of the at least one first identifier.
17. The non-transitory computer-readable storage medium of claim 11, wherein the at least one sensor includes a light detection and ranging device and an imaging sensor, wherein the first feature includes a high reflection sub-zone of the at least one first identifier, wherein the high reflection sub-zone is configured to reflect a laser, and the second feature includes at least one of a profile, shape, or pattern of the object.

* * * * *